US010291706B1

(12) United States Patent
Zhao et al.

(10) Patent No.: US 10,291,706 B1
(45) Date of Patent: May 14, 2019

(54) CONTAINER IMAGE DISTRIBUTION ACCELERATION

(71) Applicants: EMC Corporation, Hopkinton, MA (US); EMC IP Holding Company LLC, Hopkinton, MA (US)

(72) Inventors: Accela Zhao, Shanghai (CN); Yu Cao, Beijing (CN); Layne Peng, Shanghai (CN); Junping Zhao, Beijing (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 440 days.

(21) Appl. No.: 15/079,424

(22) Filed: Mar. 24, 2016

(51) Int. Cl.
*G06F 15/16* (2006.01)
*H04L 29/08* (2006.01)

(52) U.S. Cl.
CPC ................... *H04L 67/1097* (2013.01)

(58) Field of Classification Search
CPC ..................... G06F 21/57; G06F 8/63
See application file for complete search history.

(56) References Cited

U.S. PATENT DOCUMENTS

| 9,355,248 | B1* | 5/2016 | Wiest | G06F 21/55 |
| 9,436,585 | B1* | 9/2016 | Bak | G06F 8/71 |
| 9,507,612 | B1* | 11/2016 | Henry | G06F 9/452 |
| 9,819,609 | B2* | 11/2017 | Nanjundaswamy | H04L 47/783 |
| 9,934,073 | B2* | 4/2018 | Xu | G06F 9/5083 |
| 9,965,261 | B2* | 5/2018 | Chen | G06F 9/44521 |
| 2006/0047751 | A1* | 3/2006 | Chen | H04L 47/10 709/205 |
| 2008/0155120 | A1* | 6/2008 | Argawal | H04L 67/104 709/242 |
| 2012/0041844 | A1* | 2/2012 | Shen | G06Q 30/06 705/26.61 |
| 2012/0084264 | A1* | 4/2012 | Henderson | G06F 17/30115 707/672 |
| 2014/0280859 | A1* | 9/2014 | Liu | H04L 67/06 709/223 |

(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

*Primary Examiner* — Hamza N Algibhah
(74) *Attorney, Agent, or Firm* — Ryan, Mason & Lewis, LLP (57) ABSTRACT

A container image registry is maintained at each host device in a set of host devices in a container hosting environment. A container image is composed of one or more container image layers such that each container image registry of each host device is configured to be able to store one or more different layers of one or more different container images. The method tracks which container image registry at which host device contains which container image layers. At each host device, one or more container images are obtained for launching one or more application programs. For a given host device, the one or more container images are obtained from one or more of: (i) one or more container image layers stored in its container image registry; and (ii) one or more container image layers stored in the container image registry of another host device.

20 Claims, 4 Drawing Sheets

(56) References Cited

U.S. PATENT DOCUMENTS

| | | | |
|---|---|---|---|
| 2014/0310418 A1* | 10/2014 | Sorenson, III | H04L 67/1002 709/226 |
| 2015/0358402 A1* | 12/2015 | Stolyar | H04L 47/125 709/226 |
| 2015/0363216 A1* | 12/2015 | Sampathkumar | G06F 9/45558 718/1 |
| 2016/0162666 A1* | 6/2016 | Casey | G06F 9/45558 726/29 |
| 2017/0052771 A1* | 2/2017 | Chen | G06F 9/45558 |
| 2017/0177860 A1* | 6/2017 | Suarez | G06F 21/53 |
| 2017/0177877 A1* | 6/2017 | Suarez | G06F 21/577 |
| 2017/0180346 A1* | 6/2017 | Suarez | G06F 9/45558 |
| 2017/0249374 A1* | 8/2017 | Parees | G06F 17/30598 |
| 2017/0372173 A1* | 12/2017 | Kairali | G06K 9/6218 |
| 2018/0146069 A1* | 5/2018 | Du | H04L 67/1008 |
| 2018/0157508 A1* | 6/2018 | Chen | G06F 9/50 |

\* cited by examiner

FIG. 5

CONTAINER IMAGE DISTRIBUTION ACCELERATION

FIELD

The field relates generally to computing environments, and more particularly to container image distribution in such computing environments.

BACKGROUND

Computing environments, such as data centers, frequently employ cloud computing platforms, where "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud-based data centers are deployed and managed by cloud service providers, who provide a computing environment for customers (tenants) to run their application programs (e.g. business applications or otherwise). Such cloud computing platforms may be implemented at least in part utilizing one or more virtual compute elements such as one or more virtual machines (VMs) or one or more containers. By way of example, one commonly used type of container is a Docker container.

Containers benefit application packaging and delivery and also have smaller runtime footprints compared to VMs. Thus, an increasing amount of applications adopt containers as their hosting environment. A running container is launched from a container image. In existing systems, the devices hosting the applications (host devices) obtain container images by pulling them from a central image registry.

SUMMARY

Embodiments of the invention provide techniques for container image distribution acceleration.

For example, in one embodiment, a method comprises the following steps. A container image registry is maintained at each host device in a set of host devices in a container hosting environment. A container image is composed of one or more container image layers such that each container image registry of each host device is configured to be able to store one or more different layers of one or more different container images. The method tracks which container image registry at which host device contains which container image layers. At each host device, one or more container images are obtained for launching one or more application programs. For a given host device, the one or more container images are obtained from one or more of: (i) one or more container image layers stored in its container image registry; and (ii) one or more container image layers stored in the container image registry of another host device.

Advantageously, by distributing the container images across image registries at the host devices and enabling host devices to pull layers from other host devices, rather than using a central image registry, a single point of failure (SPOF) is avoided. Other advantages will be evident from various embodiments described herein.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above, there is an increasing trend to host production application programs (applications) in containers. Containers benefit application packaging and delivery. For example, at runtime, a container consumes fewer resources than a virtual machine (VM), and has faster launch and termination speeds. Containers are a foundational component in Platform as a Service (PaaS) frameworks such as CloudFoundry (CF), Kubernetes (K8S) and Mesos. By way of example, one commonly used type of container is a Docker container.

In a cloud computing platform, we call a cluster of host devices (hosts) that use containers to host applications a container hosting environment.

A running (executing) container is launched from its container image. Before a container is launched, the host needs to obtain the corresponding container image. Given the amount of hosts and various types of container images in a large cluster, the manner in which a container image is efficiently distributed to hosts is a challenge. Normal application launch depends on download of the container image. Many hosts downloading a container image simultaneously may create congestion. A large percent of normal capacity of the container hosting environment may be wasted by image distribution rather than useful application workload. In a PaaS framework that constantly launches, terminates, and re-launches applications, such as Mesos, hosts have more need to pull (obtain) images because new applications may be scheduled to run on them.

Figure 1:
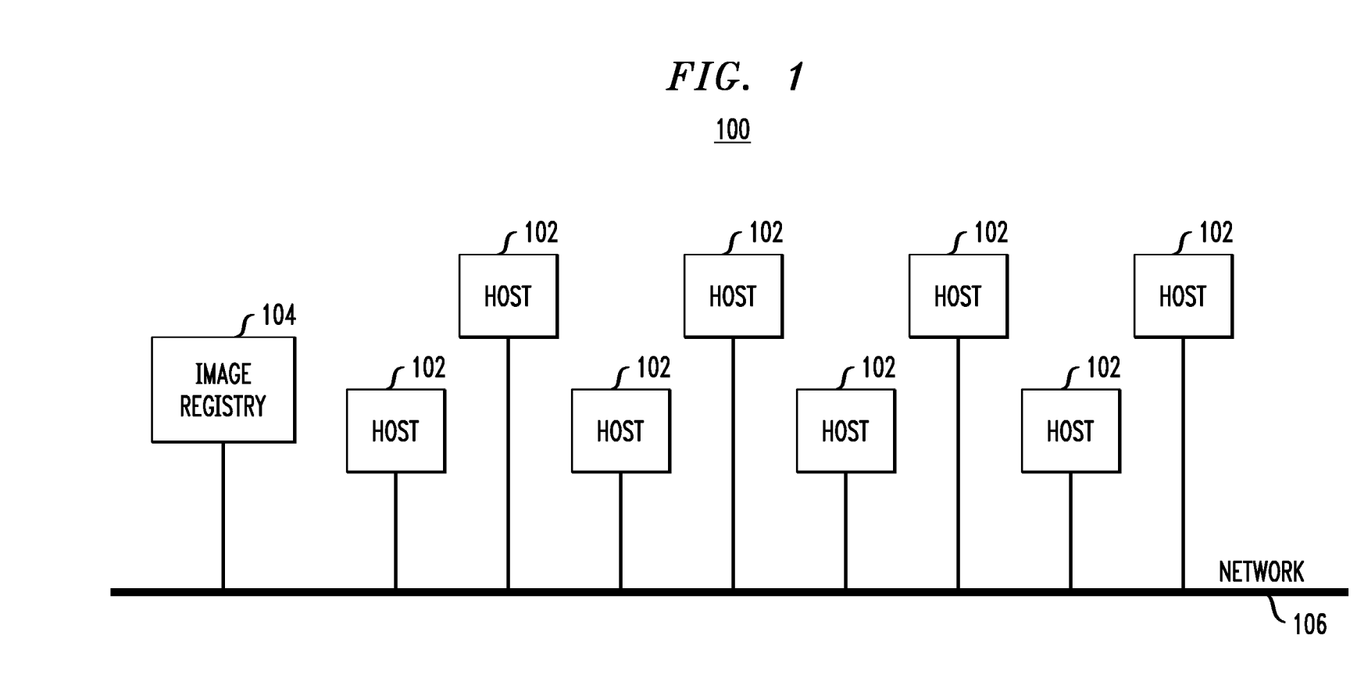
FIG. 1 illustrates a container hosting environment with a central container image registry in accordance with which one or more embodiments of the invention will be described.

We model the container hosting environment as depicted in FIG. 1. As shown, a container hosting environment 100 comprises a plurality of hosts 102 operatively coupled to a central container image registry 104 via a network 106. This configuration depicts most PaaS platforms as mentioned above.

A host is a worker node where a container runs to host an application. Central container image registry 104 stores the container images. Hosts 102 and image registry 104 are inter-connected by a network 106. Prior to the host launching a container, the host 102 needs to pull a corresponding container image from image registry 104. The act of pulling a container image consumes resources, such as network bandwidth, CPU (central processing unit), memory, disk input/output (IO), on both the puller side (host) and pullee side (image registry).

Figure 2:
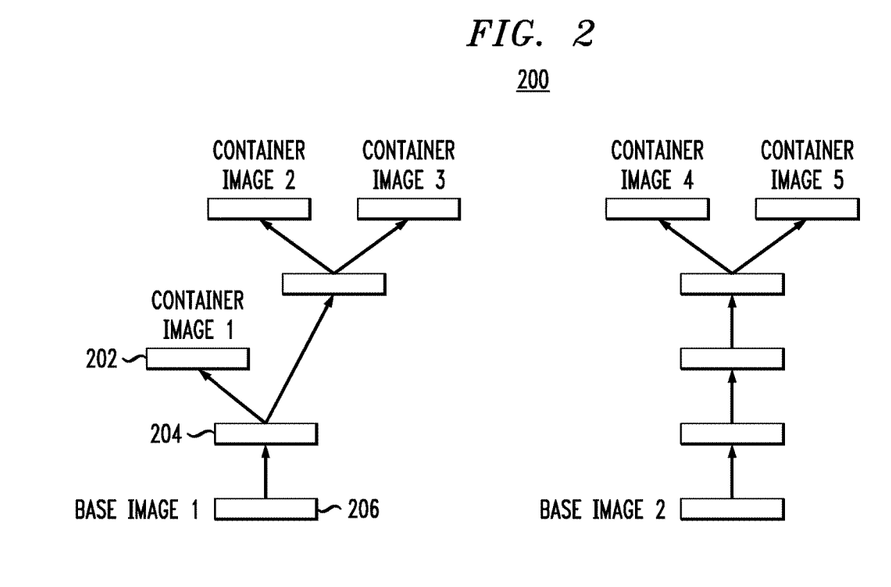
FIG. 2 illustrates container image layers in accordance with which one or more embodiments of the invention will be described.

FIG. 2 illustrates container image layers. In a Docker container implementation, a container image is structured as a chain of layers. Each new modification is represented as a new layer, added on top of its parent. Layers can branch, and containers may share their parent layers. The container images stored in image registry 104 can be seen as a forest of layers 200 as shown in FIG. 2. By way of example, container image 1 is comprised of layers 202, 204 and 206, with 206 being a base image layer ("parent"). Note how other container images share the same layers and even the same base image layer.

When the container hosting environment 100 is initially launched, a large amount of hosts 102 start to pull image from image registry 104, which may potentially create congestion. When the container hosting environment 100 is already up and running, fewer hosts 102 will be pulling image but they still need to do it for newly launched applications or application upgrades.

It is realized herein that it is important to consider quality of service (QoS) and avoid interfering with normal application workload.

Different hosts can be hosting different applications, so that different images are required by them. There may be many different images being pulled from image registry 104 simultaneously. Since many container images may share their parent (base) layers, the more images for which a given layer is a "parent," the more frequently it is pulled.

In the container hosting environment 100, the hosts 102 can only pull container images from the central image registry 104. How fast the container images can be distributed to hosts is limited by the outbound network bandwidth of the central image registry, and the processing power (such as, e.g., CPU, memory, disk IO) it provides. Note that the more different types of images that are being served simultaneously on the image registry, the more memory that is required. In the centralized architecture of FIG. 1, image registry 104 easily becomes a performance bottleneck or a single point of failure (SPOF) if the image registry fails. Even if the image registry 104 itself can be enhanced by various high availability (HA) techniques, the SPOF still exists when one of the following problems occur: the outbound network switch fails, the image registry is temporally overloaded, existing software bug or malware brings all image registry nodes down, etc.

Embodiments of the invention realize that container images and layers should be obtainable from any location at which they reside. Besides image registry, many hosts actually hold copies of container images and layers. Thus, embodiments enable for a host to pull from another host to obtain specific image layers. Each host, which may already hold copies of container images and layers, is configured to serve as pullee. The system becomes more robust after the image registry function is decentralized. Even if not all images can be provided by the hosts, the impact of an image registry failure can be minimized.

While a container image is being distributed to hosts, the normal application may also be running and serving some business purpose. It is important to avoid normal application workload being impacted, because image distribution is taking too much bandwidth or processing power. Therefore, embodiments apply QoS to both limit and intelligently select how much resource should be used by each host for image distribution. The actual limit may be varying on different hosts and different time windows.

Embodiments of the invention consider how to maximize the reuse of existing technology. Existing image implementation supports layers, and the image registry allows pulling images, for example, Docker. With a minor amount of modification to existing image registry implementations, embodiments allow single layers to be pulled.

By allowing layers to be pulled individually from an image registry, it brings new potential to accelerate image distribution, because we can now leverage the layers. The existing container image and image registry implementations are also respected.

Accordingly, embodiments of the invention accelerate container image distribution by enabling the hosts to pull images and layers from each other. A single layer can be pulled rather than a whole image. A tracking function is added to keep track of which hosts have which layers. The tracking function also tracks a current puller count on each host, so that QoS can be applied as will be explained.

Figure 3:
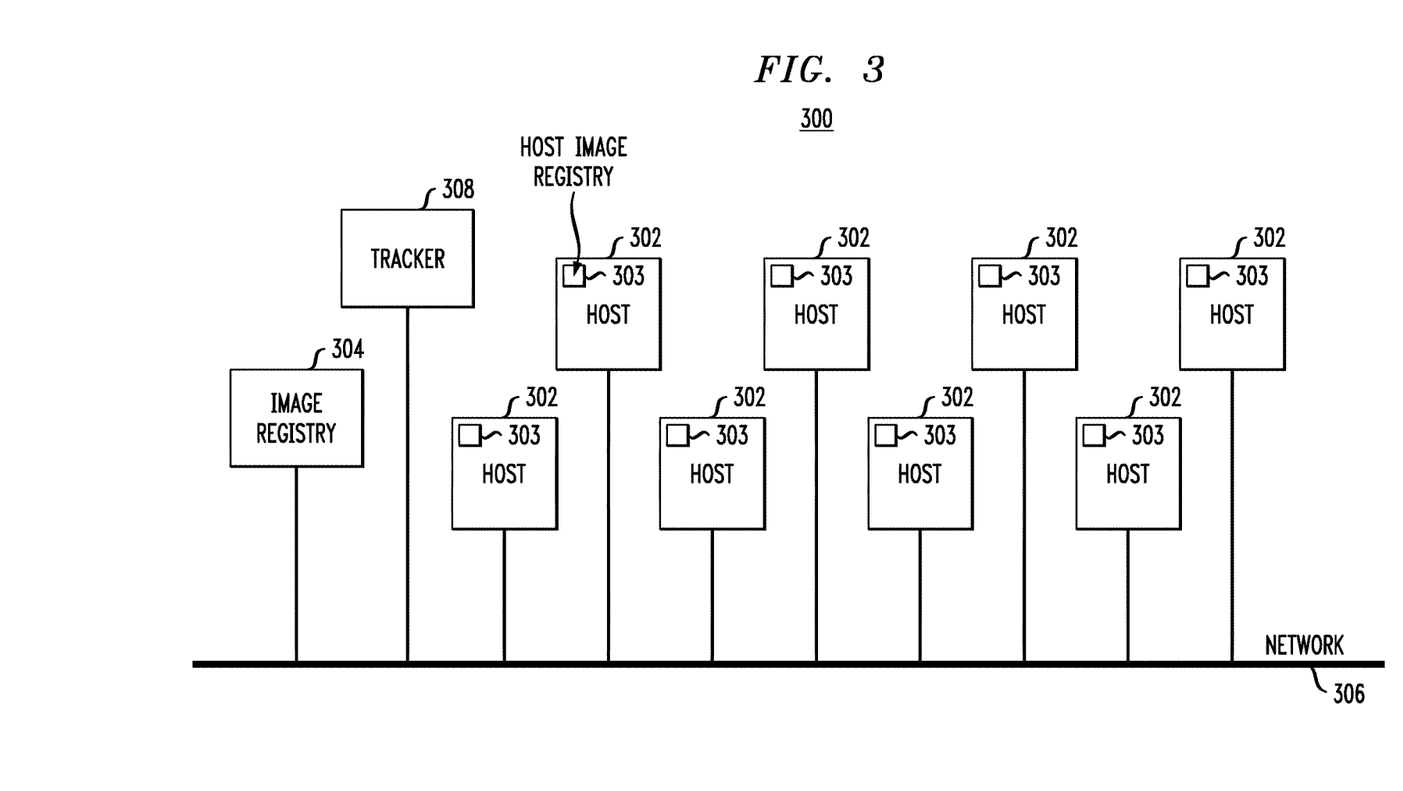
FIG. 3 illustrates a container hosting environment with container image distribution acceleration functionality, according to an embodiment of the invention.

FIG. 3 illustrates a container hosting environment 300 with container image distribution acceleration functionality, according to an embodiment of the invention. As shown, each host 302 maintains its own dedicated image registry 303, which is called a host image registry. Every image layer pulled by this host 302 is uploaded to its host image registry 303. The host image registry 303 supports pulling by individual layer. When another host 302 needs an image layer, it can choose to pull it from the host image registry of another host (or it can pull it from its own image registry if it is there).

The central image registry 304 is still shown in the container hosting environment 300 since, at least initially, the hosts 302 will need to pull images from there. But after some time, when various hosts 302 acquire different images and/or layers, then hosts can pull from other hosts rather than from image registry 304. Also shown in environment 300 is tracker module referred to as tracker 308 which provides the tracking functions mentioned above and described in further detail below. The hosts 302, image registry 304 and tracker 308 are inter-connected via network 306.

Thus, the tracker 308 is network accessible by each host 302. The tracker 308 maintains a tracker table, which contains the following fields:

1) Host identifier (id);
2) Which image layers each host has in its image registry 303;
3) How many other hosts are currently pulling from a given host; and
4) The maximum number of how many other hosts are allowed to be pulling from a given host.

When a host 302 tries to obtain a certain image layer, it looks up all the available hosts from tracker 308, and randomly selects one host from which to pull the image layer. When a host 302 tries to obtain an image, for each layer it can choose to pull from a different host 302 or image registry 304.

Below is the workflow for when a host tries to obtain a certain image:

1) Host A wants to obtain image M.
2) Host A checks what image layers it already has for M (because M may share some layers with other images), and what image layers it does not have for M. The missing image layers are named as L1 . . . LN.
3) For L1 in L1 to LN, do below simultaneously.
4) Lookup from tracker the list H of which host holds Li, and for which field 3 is less than field 4 (in tracker table, see above).
5) Randomly select one host Hj for list H.
6) Add one to field 3 of Hj in tracker table.
7) Pull layer Li from the host Hj
8) After finished pulling, subtract one from field 3 of Hj in tracker table.
9) Add layer Li to field 2 to host A in tracker table.

Besides the above workflow, the host should periodically update its corresponding field 4 in the tracker table. For the given host, the value should be set to a number representing how many other hosts can be pulling from it, without impacting normal application workload.

Advantageously, as illustratively explained herein, embodiments of the invention allow a host to pull image layers from another host. When a container hosting environment is initially launched, hosts pull image from image registry. During the process of image distribution, more and more hosts hold more and more image layers. A host has an increasingly larger choice of where to pull an image layer. The workload of serving an image is distributed across the cluster. Each layer can be pulled from different hosts in parallel. The centralized SPOF and bottleneck problems of the central image registry are eliminated. The image distribution process is accelerated.

Since the image pulling workload is distributed, each host only needs to host a few image layers. Less memory is required in both the image registry 304 and the host 302 to serve the pullers.

The more images for which an image layer is a "parent," the more hosts need to obtain it. But there would also be more hosts able to serve it, so that the workload is balanced automatically.

A container image is structured into layers. Hosts in the existing container hosting environment architecture pull images as a whole rather than by layers. Thus, the characteristics of image layering are not taken advantage of by the existing architecture.

Embodiments of the invention allow hosts to pull container image at a granularity of layers. The process of pulling an image is distributed into a group of hosts where each may hold a layer of that image. The pulling process becomes parallel and accelerated. The workload is distributed and congestion is avoided.

We could divide an image into trunks rather than layers. However, in illustrative embodiments, this approach is not chosen because by dividing image into layers, the existing image registry implementation can be reused with reasonably minor modifications.

It is important to choose how much resource is used for pulling images. The existing container hosting environment does not address this issue. It is easy for an image registry to be overloaded, given too many hosts are pulling from it.

Embodiments of the invention provide a tracker module that keeps track of how many simultaneous pullers there are for each host in field 3. The host is able to set its maximum allowed puller count in field 4, given its current application workload. Since the puller count is limited, normal application workload will not be impacted by image pulling.

To enable each host to serve container images, each host launches its own image registry to fulfil that purpose. The existing image registry is reused. To enable pulling individual image layer from an image registry, it needs modification. But since the layers are already supported inside a container image, the effort is minor. Other than enabling each host to maintain its own image registry, the only new component needed in an existing architecture is the tracker module, which is essentially a lookup table.

Embodiments of the invention also ensure image integrity while they are distributed in a decentralized manner. An image registry employs trust certificates and image signatures to address the image integrity problem. Since we reuse image registry and every host distributes images, the trust certificate and image signature mechanisms are inherited. If an image is modified while it is transferring from a host, the signature will not match. The image signature prevents hosts from tampering with image content.

Embodiments of the invention maintain image consistency while they are distributed in a decentralized manner. Container images are structured as layers. Upon new modification, old layers will not change and a new layer is added. So a layer is immutable. The consistency problem by nature does not exist. For each image layer, a host either has it or does not have it, which is tracked by the tracker module. If two hosts have the same image layer, their content must be identical.

Since each host needs a copy of container images, it is possible to employ a shared storage, which contains every image, across the hosts. In this manner, no image distribution is required. However, we do not consider this approach since a shared storage is by nature a centralized architecture. The image data still needs to be copied from the shared storage to each host. It has the same problem with the centralized image registry architecture discussed above. With too many hosts requesting images, the shared storage may be subject to overload and become a bottleneck. It is also possible that the network switch between hosts and shared storage becomes a SPOF.

We use the tracker to keep track of which host has which image layer and the active puller count. We consider whether the tracker module could become a new central bottleneck and SPOF. Different from the existing image registry implementation, without image downloading workload, the tracker module carries much less burden. It is essentially a lookup table. To scale out the tracker module and make it of high availability, embodiments can implement it stateless and use a distributed Structured Query Language (SQL) or None Structured Query Language (NoSQL) backend. With more and more hosts obtaining their desired images, there will be less and less updates to the tracker module. To further solve the SPOF problem, more than one stateless tracker server may be implemented with each tracker module sharing the same backend, and each host is configured to failover among the different tracker modules.

The following example will illustrate how we apply the new image distribution method to a typical container hosting environment to improve the overall performance.

In a typical container hosting environment, for example Kubernetes, there is an image registry and a large amount of hosts. They are interconnected by a network. Before each host is able to run its application container, it needs to obtain corresponding container images. The container images are pulled from the image registry. This is a centralized architecture. When there are too many hosts pulling images in the same time, the following problems may occur:

Problem 1: The image registry becomes a bottleneck when serving so many hosts. It is overloaded and the overall image distribution progress is very slow. Significant time is spent on image distribution rather than running application containers which create the actual business value.

Problem 2: The image registry, which stands in a central point of image distribution, may become a SPOF. When it fails, image distribution across the whole cluster is blocked. Even if the image registry is enhanced by HA, network switch failure, overload, or software bugs are still able to bring it down.

Problem 3: There is no QoS control when hosts are pulling their images. The image registry may be pulled by too many hosts and results in overload. The hosts may be spending too much bandwidth pulling and this impacts normal application workload.

After applying the new image distribution method, each host has its own image registry. The image is structured by layers and pulled by layers. Initially, the hosts pull image layers from the previous image registry. After that, once a host wants to obtain an image, it pulls layers simultaneously from other hosts who have one of them. A tracker module is added to keep track of which host has which image layer. The image distribution is decentralized and accelerated. The above problems are therefore solved as follows:

Problem 1: The previous image registry is no longer a bottleneck. The hosts pull image layers from hosts. An image is divided as a series of layers. The traffic to obtain each layer of an image may happen on a different host. The image distribution workload is decentralized across all hosts and accelerated. A bottleneck no long exists.

Problem 2: Since the image distribution workload is decentralized across all hosts, the SPOF of the previous image registry does not exist. Even if it fails, a host is able to obtain an image layer from another host which already holds it.

Problem 3: To address QoS, the tracker module keeps track of the current puller count and maximum allowed pullers. A host is able to update how many pullers it allows, according to its current normal application workload. The processing power and network bandwidth spent on image pulling are limited, so that normal application workload will not be impacted.

As a result, with the container image distribution method according to embodiments of the invention applied, the existing bottleneck and SPOF of image registry is decentralized. The image distribution process is accelerated. QoS is respected by tracking the active puller count.

Figure 4:
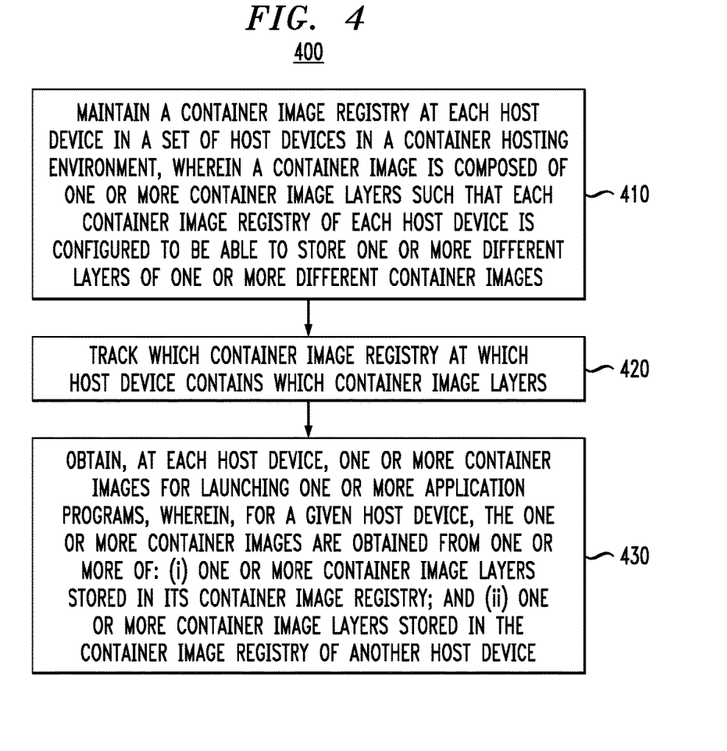
FIG. 4 illustrates a container image distribution acceleration methodology, according to an embodiment of the invention.

FIG. 4 illustratively summarizes a container image distribution acceleration methodology, according to an embodiment of the invention. For example, methodology 400 can be employed in container hosting environment 300 depicted in FIG. 3.

Step 410 maintains a container image registry at each host device in a set of host devices in a container hosting environment. A container image is composed of one or more container image layers such that each container image registry of each host device is configured to be able to store one or more different layers of one or more different container images.

Step 420 tracks which container image registry at which host device contains which container image layers.

Step 430 obtains, at each host device, one or more container images for launching one or more application programs. For a given host device, the one or more container images are obtained from one or more of: (i) one or more container image layers stored in its container image registry; and (ii) one or more container image layers stored in the container image registry of another host device.

Figure 5:
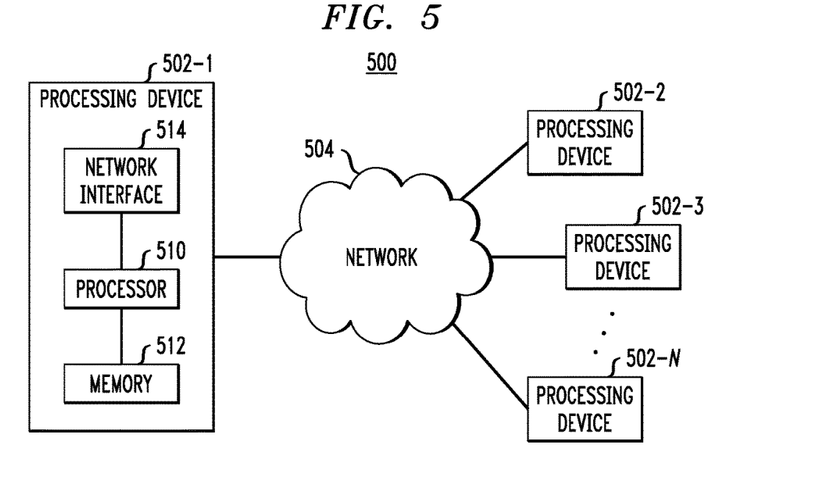
FIG. 5 illustrates a processing platform used to implement a container hosting environment with container image distribution acceleration functionality, according to an embodiment of the invention.

As an example of a processing platform on which a computing environment such as a cloud computing platform with container image distribution acceleration functionality (e.g., 300 of FIG. 3) can be implemented is processing platform 500 shown in FIG. 5. It is to be appreciated that processing platform 500 may implement the functionalities described herein.

The processing platform 500 in this embodiment comprises a plurality of processing devices, denoted 502-1, 502-2, 502-3, . . . 502-N, which communicate with one another over a network 504. It is to be appreciated that the methodologies described herein may be executed in one such processing device 502, or executed in a distributed manner across two or more such processing devices 502. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 2-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the network 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the system shown as 500 in FIG. 5 may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    maintaining a container image registry at each host device in a set of host devices in a container hosting environment, wherein a container image is composed of one or more container image layers such that each container image registry of each host device is configured to store one or more container image layers of one or more container images, wherein each host device in the set of host devices is configured to launch one or more application programs using the one or more container image layers of the one or more container images;
    tracking which container image registry at which host device contains which container image layers; and
    identifying, by a given host device, a given container image layer to be used for launching one or more application programs on the given host device;
    determining, that the given container image layer is not stored in the container image registry of the given host device;
    identifying, based on the tracking, the container image registry of at least one other host device as a container image registry in which the given container image layer is stored; and
    obtaining, by the given host device, the given container image layer from the container image registry of the at least one other host device,
    wherein the host devices are implemented via one or more processing devices operatively coupled via a communication network to form the container host environment.

2. The method of claim 1, further comprising maintaining the number of times a given host device has pulled container image layers from other container image registries.

3. The method of claim 1, wherein the tracking step further comprises maintaining a tracking structure.

4. The method of claim 3, wherein the tracking structure stores a host identifier for each host device in the set of host devices.

5. The method of claim 3, wherein the tracking structure stores an indication of which container image layers each host device currently stores in its container image registry.

6. The method of claim 3, wherein the tracking structure stores an indication of how many other host devices are currently pulling from each host device.

7. The method of claim 3, wherein the tracking structure stores an indication of the maximum number of other host devices allowed to pull from each host device.

8. The method of claim 3, wherein when a given host device seeks to pull a given container image layer to generate a container image for launching an application program, the given host device performs the steps of:
    checking to determine whether it has the given layer stored in its container image registry;
    when the given host device does not have the given layer in its registry, checking the tracking structure to determine which other host devices have the given layer; and
    randomly selecting one of the other host devices that has the given layer from which to pull the given layer.

9. The method of claim 8, wherein tracking structure is updated after the given layer is pulled.

10. The method of claim 1, wherein a given host device in the set of host devices is configured to set the maximum number of other host devices allowed to pull from the given host device.

11. A system, comprising:
    a set of host devices in a container hosting environment, each host device maintaining a container image registry, wherein a container image is composed of one or more container image layers such that each container image registry of each host device is configured to store one or more container image layers of one or more container images, wherein each host device in the set of host devices is configured to launch one or more application programs using the one or more container image layers of the one or more container images; and
    a tracker module, operatively coupled to the set of host devices, the tracker module tracking which container image registry at which host device contains which container image layers;
    wherein, for a given host device seeking to obtain a given container image layer to generate a container image for launching an application program, the given host device:
        checks to determine whether it has the given layer stored in its container image registry;
        when the given host device does not have the given layer in its registry, checks the tracker module to determine which other host devices have the given layer;

randomly selects one of the other host devices that has the given layer from which to obtain the given layer; and obtains the given layer from the randomly selected one of the other host devices;

wherein the host devices are implemented via one or more processing devices operatively coupled via a communication network to form the container host environment.

12. The system of claim 11, wherein the tracking module maintains a tracking structure.

13. The system of claim 12, wherein the tracking structure stores a host identifier for each host device in the set of host devices.

14. The system of claim 12, wherein the tracking structure stores an indication of which container image layers each host device currently stores in its container image registry.

15. The system of claim 12, wherein the tracking structure stores an indication of how many other host devices are currently obtaining layers from each host device.

16. The system of claim 12, wherein the tracking structure stores an indication of the maximum number of other host devices allowed to obtain layers from each host device.

17. The system of claim 12, wherein tracking structure is updated after the given layer is obtained.

18. The system of claim 11, wherein a given host device in the set of host devices is configured to set the maximum number of other host devices allowed to obtain layers from the given host device.

19. A method, comprising:

for a given host device, in a set of host devices in a container hosting environment, that is seeking to launch an application program on the given host device, wherein each host device in the set of host devices maintains its own container image registry, and a container image is composed of one or more container image layers such that each container image registry of each host device is configured to store one or more container image layers of one or more container images, wherein each host device in the set of host devices is configured to launch one or more application programs using the one or more container image layers of the one or more container images;

the given host device determining that it does not have a given container image layer to be used for launching the application program on the given host device in its container image registry;

the given host device accessing a tracking structure that tracks which container image registry at which host device contains which container image layers, and checking the tracking structure to determine which other host devices have the given container image layer; and the given host device randomly selecting one of the other host devices that has the given container image layer from which to pull the given container image layer; and the given host device pulling the given container image layer from the randomly selected one of the other host devices.

20. The method of claim 19, wherein the given host device updates the tracking structure after the given layer is pulled.

* * * * *